(12) United States Patent
Lehr et al.

(10) Patent No.: US 8,062,605 B2
(45) Date of Patent: Nov. 22, 2011

(54) COOLING SYSTEM AND SHELL-TYPE REACTOR WITH SUCH COOLING SYSTEM

(75) Inventors: Manfred Lehr, Deggendorf (DE); Wolfgang Primbs, Schwarzach (DE)

(73) Assignee: MAN DWE GmbH (DE)

( * ) Notice: Subject to any disclaimer, the term of this patent is extended or adjusted under 35 U.S.C. 154(b) by 104 days.

(21) Appl. No.: 12/752,249

(22) Filed: Apr. 1, 2010

(65) Prior Publication Data
US 2010/0260651 A1 Oct. 14, 2010

Related U.S. Application Data

(60) Provisional application No. 61/169,431, filed on Apr. 15, 2009.

(30) Foreign Application Priority Data

Apr. 8, 2009 (DE) ...................... 20 2009 005 398 U (51) Int. Cl.
*F28D 7/00* (2006.01)
(52) U.S. Cl. ......................... 422/201; 422/200; 165/82
(58) Field of Classification Search .................... 422/201
See application file for complete search history.

(56) References Cited

U.S. PATENT DOCUMENTS

| 1,894,768 | A | * | 1/1933 | Hechenbleikner | 422/109 |
|---|---|---|---|---|---|
| 2,193,816 | A | * | 3/1940 | Houdry | 422/655 |
| 2,225,634 | A | * | 12/1940 | Houdry | 422/49 |
| 2,332,450 | A | | 10/1943 | Mantle | |
| 2,475,025 | A | * | 7/1949 | Huff | 518/712 |
| 3,939,804 | A | | 2/1976 | Barratt | |
| 4,140,176 | A | * | 2/1979 | Essebaggers | 165/134.1 |
| 4,361,183 | A | * | 11/1982 | Ware et al. | 165/82 |
| 5,162,104 | A | * | 11/1992 | Bezzeccheri et al. | 422/643 |
| 5,954,128 | A | | 9/1999 | Harkins et al. | |
| 7,108,835 | B2 | | 9/2006 | Hawthorne et al. | |

FOREIGN PATENT DOCUMENTS

| DE | 10 2004 055 598 | 12/2005 |
|---|---|---|
| FR | 548825 | 1/1923 |
| GB | 894504 | 4/1962 |
| GB | 1 326 978 | 8/1973 |

* cited by examiner

*Primary Examiner* — Walter Griffin
*Assistant Examiner* — Huy-Tram Nguyen
(74) *Attorney, Agent, or Firm* — Thomas & Karceski, P.C.

(57) ABSTRACT

A cooling system for use in a shell-type reactor includes vertically extending double tubes with an inner tube and an outer tube closed at its lower end. The system also includes a distributor for supplying a fluid cooling medium into the upper end of the inner tubes and a horizontally extending plate, which on its upper surface includes at least two upwardly open, parallel grooves. Two adjacent grooves are separated by a common inner wall. At least one outer tube, having an upper end, is disposed in each groove, through the plate. Each outer tube is tightly welded to the plate on the groove base. The upper, open side of each groove is closed with a lid, so that each groove forms a collector for discharging the cooling medium from the outer tubes. Each inner tube opens through the lid into a distributor and is tightly attached to the lid.

15 Claims, 8 Drawing Sheets

COOLING SYSTEM AND SHELL-TYPE REACTOR WITH SUCH COOLING SYSTEM

CROSS-REFERENCE TO RELATED APPLICATION(S)

This Non-Provisional United States patent Application relies for priority on U.S. Provisional Patent Application Ser. No. 61/169,431, filed on Apr. 15, 2009, and on German Utility Model Application No. 20 2009 005 398.9, filed on Apr. 8, 2009, the contents of both of which are incorporated herein by reference.

FIELD OF THE INVENTION

This invention relates to a cooling system for use in a shell-type reactor for catalytic exothermic reactions and to such shell-type reactor.

DESCRIPTION OF THE RELATED ART

Many catalytic exothermic reactions are performed in shell-type reactors with built-in heat exchangers which dissipate reaction heat.

One type of such reactors is a Fischer-Tropsch slurry reactor. In this reactor, a heat exchanger is disposed in the multiphase mixture, which can be configured in various ways. The reaction heat produced in the reactions often is dissipated by an evaporating heat carrier. One type of such reactors is a cooling tube reactor with bayonet tubes.

In catalytic gas-phase reactions a reaction gas mixture is passed through a catalyst bed. The reaction heat produced thereby is dissipated by a heat carrier which is separated from the catalyst bed by partitions, for example in the form of tube walls. While, in the widely used tube bundle reactors, a catalyst bed is disposed within a plurality of reaction tubes around which flows a heat carrier, the reactions in the cooling tube reactor in question here take place in a catalyst bed in which a plurality of cooling tubes are arranged, a heat carrier flowing through the cooling tubes to dissipate the reaction heat produced. In such cooling tube reactor, the operating pressures on the shell side can lie in a range between 5 and 120 bar.

The advantage of this type of construction is that a large cross-sectional area can be realized for the catalyst flow and, thus, this type of construction is particularly suitable for high gas flow rates. In general, the reaction heat is transferred to an at least partly evaporating heat carrier. Here, it is characteristic that, in the state of equilibrium of the evaporating heat carrier, both in the liquid phase and in the gas phase the same temperature exists everywhere and the boiling temperature is pressure-dependent. If it is desired to adjust the optimum reaction temperature for a particular process, this determines automatically the required operating pressure on the side of the heat carrier.

The reaction heat can directly be used here for generating useful steam. There is no need for an expensive system with primary and secondary heat carrier circuits. Water is preferably used as evaporating heat carrier. Usual operating pressures on the tube side lie in the range from 20 to 100 bar.

For the heat exchangers used, a large number of constructions are known. A frequently used principle is the construction with double tubes, wherein the heat carrier medium is supplied and discharged via two tubes plugged into each other.

Two examples are described in GB 1,326,978. In the heat exchanger as shown in FIG. 1 thereof, double tubes for a cooling medium (medium 1) protrude into a cylindrical space with the reaction medium (medium 2). The cylindrical space is vertically arranged in the direction of its longitudinal axis. The double tubes are formed as bayonet tubes and each consist of an outer tube with closed lower end and an inner tube disposed in the same, which is open at its lower end and terminates a small distance before the lower end of the outer tube. The upper open ends of the outer tubes pass through a tubesheet and are tightly attached to the same. At a predetermined distance above the tubesheet or the upper ends of the outer tubes, a distributor plate is arranged. The upper open ends of the inner tubes extend through this distributor plate and are tightly attached to the same. Above the distributor plate, the upper reactor head extends, which includes a supply nozzle for the medium 1 and, thus, forms a distributor. The space between the distributor plate and the tubesheet forms a collector for the medium 1 and includes a discharge nozzle. In this example, the outer tube is equipped with a plurality of pins on its outside to improve the heat transfer.

Via the supply nozzle, the medium 1 is introduced into the upper reactor head, i.e., into the distributor, and flows over the distributor plate into the inner tubes. It is passed through the inner tube up to its end and flows back again in the space between inner tube and outer tube. Upon leaving the outer tube, the medium 1 enters into the space or collector described and leaves the collector through the discharge nozzle in the reactor shell.

Due to this double-tube construction, inadmissible tensions are avoided, which occur as a result of different linear expansions of reactor shell and heat exchanger tubes, when the heat exchanger tubes are firmly fixed in tubesheets at their two ends and these tubesheets are firmly connected with the reactor shell.

This construction is simple and suitable for small pressure differences between medium 1 and medium 2. If the pressure difference increases, the pressure difference directly acts on the tubesheet with the outer tubes. As a result, the tubesheet becomes thicker and thicker and less economic. In FIG. 5 of the same reference, the tubesheet therefore is replaced by a plurality of intermediate distributors and intermediate collectors, which are connected to a main distributor conduit or a main collecting conduit, which each are passed out of the reactor through the reactor shell. In this embodiment, the upper reactor head is also filled with medium 2.

Constructions with branching tube conduits involve the disadvantage of an expensive manufacture, since a multitude of parts such as collectors, tube conduits or bends, with (in part) poor accessibility, must safely be connected with each other. Furthermore, the accessibility for maintenance and repair likewise is rendered difficult, since due to this system, the tube conduits are disposed one above the other and the upper conduits first must be removed to gain access to the tube conduits located below the same. Demountability is improved with flange connections or by combining individual double tubes to groups. However, this requires an increased constructive effort.

If the inner and outer tubes each are mounted in a separate tubesheet, the constructions are more compact and generally easier to produce. However, if the tubesheets of large apparatuses additionally must absorb compressive forces, the tubesheets—as already mentioned above—become extremely thick and expensive. In addition, the tube-to-tubesheet welds and here especially the welds of the lower tubesheet generally are hardly accessible for repair purposes:

In the case of a leakage, the testing effort to find the leakage also is very high in both embodiments, since each double tube must be tested individually.

As compared to the embodiment shown in GB 1,326,978, FIG. 1, the heat exchangers described in GB 894,504 and FR 548,825 exhibit the advantage of a better accessibility due to multiple flange connections at the reactor end in the case of medium 1. Especially in reactors with high pressure, this leads to heavy flanges, which are complex and expensive and, in addition, involve the risk of leaks.

U.S. Pat. No. 2,332,450 shows a cooling system which, to improve the accessibility for maintenance and repair work, includes a row of boxes located one beside the other, which each form a distributor and collector for a double-tube row. Such box constructions are very expensive to produce. In addition, due to the division of the cooling system, the edge spacings of the cooling tubes are relatively large, so that part of the reaction medium is not cooled.

DE 10 2004 055 598 B3 describes a tube-bundle high-pressure heat exchanger for high pressures in medium 1. Here, medium 1 is supplied to the heat exchanger tubes through bores in the one tubesheet and is discharged through bores in the opposite tubesheet. This construction leads to very compact tubesheets, but only as long as medium 2 has no high pressures and the temperature differences between medium 1 and medium 2 do not become too great. Furthermore, the heat exchange tubes of this construction cannot be welded to the tubesheets. Therefore, the tensile forces of the front heads must be absorbed by additional anchors, and there is a risk of leaks between the media 1 and 2.

In U.S. Pat. No. 3,939,804 a three-stage evaporator with double tubes is described, by means of which water is heated in a first step, the water is heated to obtain saturated steam in a second step, and the saturated steam is superheated in a third step. The supply of feed water and the removal of the superheated steam is effected at the end face. In this configuration, the double tubes have the function of evaporator tubes. In each heating step, the entering medium each is passed upwards in an inner tube and heated when flowing down. Constructively, the double tubes of each stage are configured as described above in GB 1,326,978, FIG. 1. Medium 2 here is hot helium. The distribution and collecting chambers of all heat transfer steps are located on an end face of the evaporator. The tubesheet, thus, has the function of a front head. Because of the great load substantially exerted by pressure and temperature, the tubesheet is very thick.

U.S. Pat. No. 5,954,128 describes a double-tube construction for use at high temperatures and with corrosive media. The inlet and the outlet here are disposed at right angles with respect to each other. The ceramic outer tubes of the double tubes are connected with tubular thin-walled distributor channels, which, in turn, are embedded in a reinforced brick lining. For use at higher pressures, this concept is only suitable to a limited extent.

U.S. Pat. No. 7,108,835 B2 describes a variant of the type of cooling system described in GB 1,326,978. FIG. 5, in the application of a Fischer-Tropsch slurry reactor. Here, the reactor is arranged vertically and the double tubes are arranged in a hanging or suspended position. The reactions take place in medium 2 and are exothermic. In this reactor, the feed water is passed via a main distributor into the reactor and via a plurality of intermediate distributors to groups of double tubes. Groups of four or twelve double tubes form one group. The intermediate distributors each lead to a connecting head each with a ring-shaped distributor channel. From here, the feed water is introduced into the inner tubes of all double tubes of a group. At the end of the inner tubes, the feed water is deflected and flows upwards in the annular space between inner tubes and outer tubes, wherein it is partly evaporated by the reaction heat of the medium 2. At the end of the outer tube, the water-steam mixture flows into a ring-shaped collector channel in the connecting head. From there, intermediate collectors lead to a main collector, which again leads out of the reactor. Via rails and a number of reactor nozzles, these groups of double tubes can be pulled out of the reactor.

SUMMARY OF THE INVENTION

One embodiment of the invention contemplates a cooling system for use in a shell-type reactor for catalytic exothermic reactions, which is suitable for high pressure differences between the cooling and the reaction medium and whose manufacture, maintenance and repair is possible at low cost.

In addition, there also is proposed a shell-type reactor.

In accordance with the invention, the object is solved by a cooling system with features as discussed herein and by a shell-type reactor with features as discussed herein.

A cooling system of the invention has a high load-bearing capacity and an easy access both to the inner tubes and to the outer tubes and also a simple possibility for leak testing, and all at relatively low manufacturing costs. A plate, for example, is a relatively inexpensive component and the production of grooves on the upper surface of the plate is a simple operation. In accordance with this application, a curved surface element or a curved shape also is referred to as plate. Preferably, the plate is formed flat. The grooves perform several functions at the same time. When they are closed with a lid, they form a hollow cross-section with a favorable ratio of load-bearing capacity to expenditure of material. The tubesheet can be formed relatively thin, which considerably reduces the material costs, and nevertheless high differential pressures between cooling medium and reaction medium can be absorbed in the operating condition. With relatively little expenditure of material, however, the cooling system can absorb not only high external pressures, but also high internal pressures, since only the outer walls of the grooves are pressure-loaded. Due to the fact that adjacent grooves are separated from each other by a common inner wall, these inner walls are pressure-relieved also at a high pressure in the cooling medium, since the pressure is applied to both sides of the inner wall. Its wall thickness therefore can be small, which leads to a corresponding saving of material. Due to the small inner wall thickness and since the outer tubes also are connected with the plate by means of welding seams, the outer tubes can be arranged with very narrow tube spacings. Thus, very high cooling capacities can be achieved. Each groove forms a separate collector for the cooling medium, which from the outer tubes, which open into the groove, flows into the groove. Due to this separation of the grooves, it is possible to separately test each groove for tightness by using the double tubes which are in flow connection with the same, and, in this way, to localize leakages detected in the cooling system, i.e., to limit localization to a particular groove. For maintenance and/or repair, the lid with which a groove is closed can easily be removed along with the inner tubes attached thereto, so that the outer tubes disposed thereunder are easily accessible. On the groove base, the outer tubes each are welded to the plate, so that with the lid removed they are easily accessible for maintenance and/or repair work. Thus, every single inner and/or outer tube is accessible without having to perform major demounting operations. Upon completion of the work, the lid with the inner tubes attached thereto is again mounted on this individual groove. In this way, maintenance and repair work can be performed quickly and easily. Due to the few and easily accessible welding seams, manufacture is also considerably simplified.

Preferably, the side walls of the grooves extend upwards beyond the respectively associated lid, and the upper end of the grooves is closed with a second lid and the inner tubes open into the space between the first and the second lid, so that this space forms a distributor. With these measures, the groove is utilized not only as a collector, but also as a distributor. The formation of separate distributors, hence, is no longer necessary. The manufacturing costs are further reduced and the accessibility is further improved, since, in the upper reactor head above the grooves, no space must be provided for distributors.

The second lid advantageously is of arcuate shape. Arcuate lids are particularly suitable for absorbing and transferring compressive forces.

In a favorable development of the invention, the plate is supported only in its edge region and the wall thickness of the plate below the groove bases is so great that the plate is self-supporting. An increase in load-bearing capacity, thus, can be achieved in a simple manner by adaptation of this wall thickness. Additional bearing, supporting and/or rib constructions, thus, are avoided.

In a preferred embodiment of the invention, the grooves each extend as longitudinal grooves between edge regions facing each other. For supplying and discharging the cooling medium, the grooves thus can directly be connected to ports which extend through the reactor shell.

Particularly preferably, the longitudinal grooves end before the circumferential plate edge. This embodiment is suitable both for a plate whose circumferential edge is not connected with the inner shell surface and also for a plate which, along its circumferential edge, is welded, for example, to the inner shell surface and whose grooves are drilled into through the shell.

In a favorable development of the invention, bores are arranged in the edge region of the plate, with one end thereof open into the circumferential plate edge and with the other end thereof into a groove. With such bores, a connection of the grooves to means for supplying and discharging the cooling medium is particularly easily possible.

Preferably, the plate has at least one open cross-section extending through the entire plate thickness. With this measure—when the cooling system is incorporated in a shell-type reactor—the space below the plate and the space above the plate are fluidly connected with each other, so that at high pressures in the reaction medium a pressure compensation takes place between the upper and the lower surface of the plate.

A shell-type reactor in accordance with the invention in particular can be configured as a Fischer-Tropsch slurry reactor, but, for example, also as a reactor with fixed-bed catalyst, e.g., as a methanol reactor.

In the shell-type reactor of the invention, the plate of the cooling system preferably is tightly connected with the shell in its edge region. Particularly preferably, the plate is arranged between two shell sections and the cirumferential plate edge is part of the outer shell surface. In this embodiment, the circumferential plate edge can be prepared for direct connection to means for supplying and/or discharging the cooling medium. Alternatively, however, it is also possible to tightly weld the circumferential plate edge to the inner shell surface.

In an advantageous aspect of the invention, bores extend through the shell and the edge region of the plate, which with one end thereof open into the outer shell surface and with the other end thereof into a groove. In this way, an inexpensive possibility for connection of the grooves to the outer shell surface is achieved.

In the case of a tight connection of the edge region of the plate with the shell, a bypass conduit preferably is arranged on the outer shell surface, which connects the space below the plate with the space above the plate. In this way, a pressure compensation is achieved between the lower surface and the upper surface of the plate.

In a further preferred embodiment of the invention, the circumferential plate edge is shaped such that at least one open cross-section is formed between the same and the inner shell surface, which connects the space below the plate with the space above the plate, in order to effect a pressure compensation between the lower surface and the upper surface of the plate.

In yet another preferred embodiment of the invention, the plate is formed of at least two parts in horizontal direction, which lie one beside the other and between them form a gap of predetermined size, which connects the space below the plate with the space above the plate. With this configuration, not only is pressure compensation achieved, but it is also made possible that, for example, in the case of a repair of the plate, the cooling system need not be removed from the shell-type reactor as a whole. Rather, the parts can be removed from the shell-type reactor individually, one after the other, or possibly also only the one part in need of repair. With such a division, the plate can, for example, be formed by several plate strips lying one beside the other, which between them each form a gap. The accessibility to the outer and inner tubes in the case of repair then is improved considerably.

BRIEF DESCRIPTION OF THE DRAWINGS

The invention will subsequently be explained in greater detail by way of example with reference to the drawings, in which.

DETAILED DESCRIPTION OF
EMBODIMENT(S) OF THE INVENTION

The embodiments of cooling systems 1 of the invention, which are shown in the Figures, include a horizontal plate 2 with grooves 4 formed on its upper surface 3, which each are closed with a lid 5, wherein double tubes 6 extend through the plate 2 and are attached to the same.

The grooves 4 extend parallel to each other and open upwards. They can be formed, e.g., by milling or by weldedon webs. Respectively, adjacent grooves 4 are separated from each other by a common inner wall 7. The inner walls 7 between the grooves 4 can be formed relatively thin, since they are pressure-relieved due to the pressure applied on both sides and only perform a separating and sealing function. The upper open side of each groove 4 is closed by the lid 5.

To enable the plate to be self-supporting, the same is formed with a correspondingly high wall thickness below the groove bases 8. It is, however, also conceivable to arrange ribs on the lower plate surface 9.

The double tubes 6 extend vertically and include an outer tube 10 and an inner tube 11. The outer tube 10 is closed at its lower end 12. The upper end 13 of each outer tube 10 opens into a groove 4. For this purpose, through holes 15 for the outer tubes 10 are formed in the plate 2, whose internal diameter corresponds to the external diameter of the outer tubes 10. On the groove base 8, the upper end 13 of each outer tube 10 is tightly welded to the plate 2 by means of a welding seam 14. The inner tube 11 extends in the outer tube 10 and extends from shortly above the lower closed end 12 of the outer tube 10 through the groove 4 and through the lid 5. The inner tube 11 is tightly welded to the lid 5 by means of a welding seam 16. Both ends 17, 18 of the inner tube 11 are open, with the upper end 18 opening into a distributor.

The axial spacings between the double tubes 6, transverse to the longitudinal direction of the groove 4, can be very small due to the low wall thickness of the inner walls 7 and the connection of the outer tubes 10 with the groove base 8 by means of welding.

Figure 1:
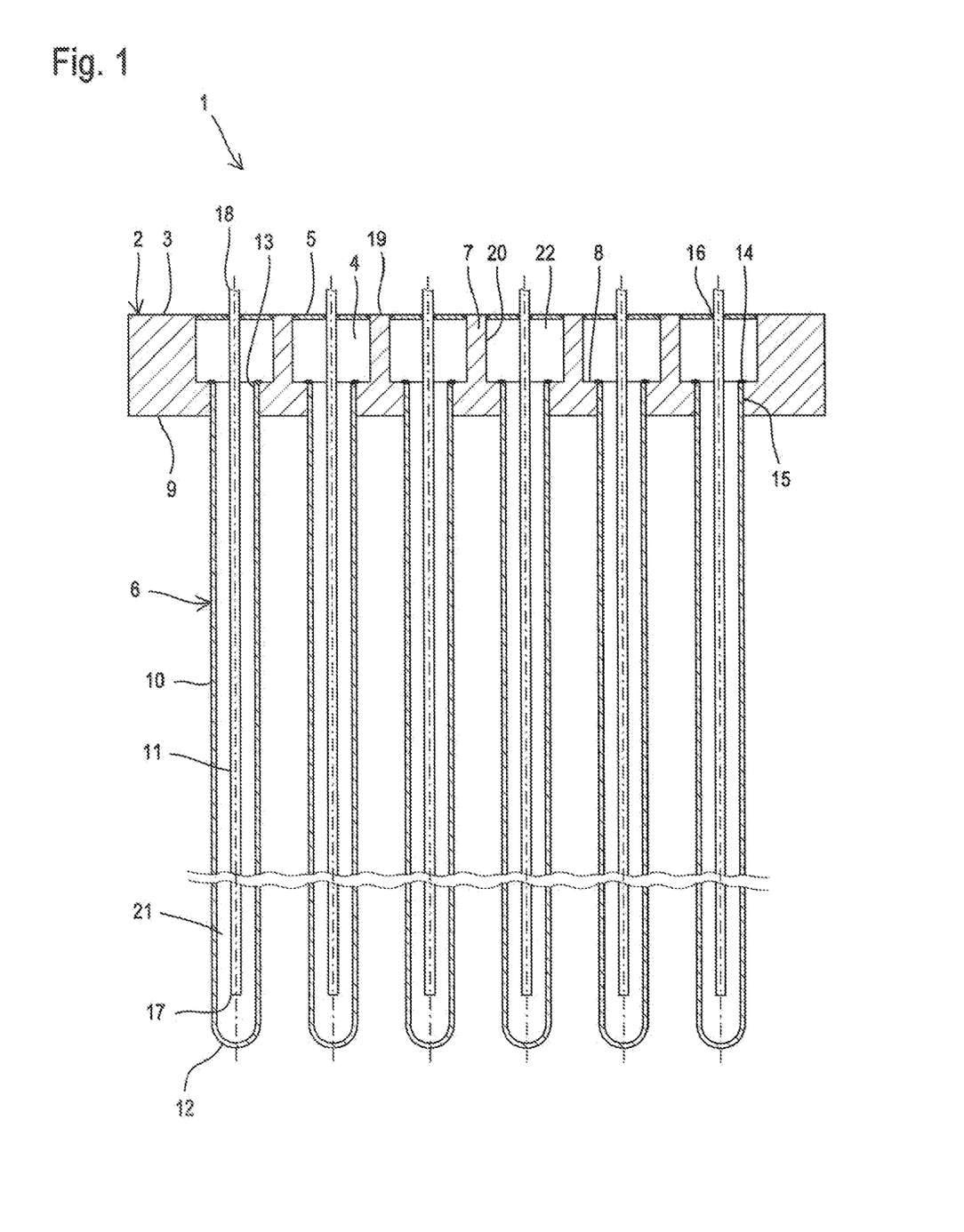
FIG. 1 shows a cross-section through a first embodiment of a cooling system in accordance with the invention.

In the embodiment shown in FIG. 1, the lids 5 are formed flat and each extend flush with the upper ends or end faces 19 of the inner walls 7. They are tightly welded to the side walls 20 of the inner walls 7. The inner tubes 11 extend through the lids 5 and open into a distributor (not shown).

The cooling medium flows from the distributor into the inner tubes 11, and from their lower ends 17 enters into the outer tubes 10. In the space 21 between inner tube 11 and outer tube 10, it flows upwards into the respective groove 4, which thus forms a collector 22 for the cooling medium emerging from the outer tubes 10. Due to the separation from each other, each groove 4 as such forms a separate collector 22.

The grooves 4 extend as longitudinal grooves between edge regions of the plate 2 located opposite each other. In their end regions, the grooves 4 are connected to a means for discharging the collected cooling medium.

Figure 2:
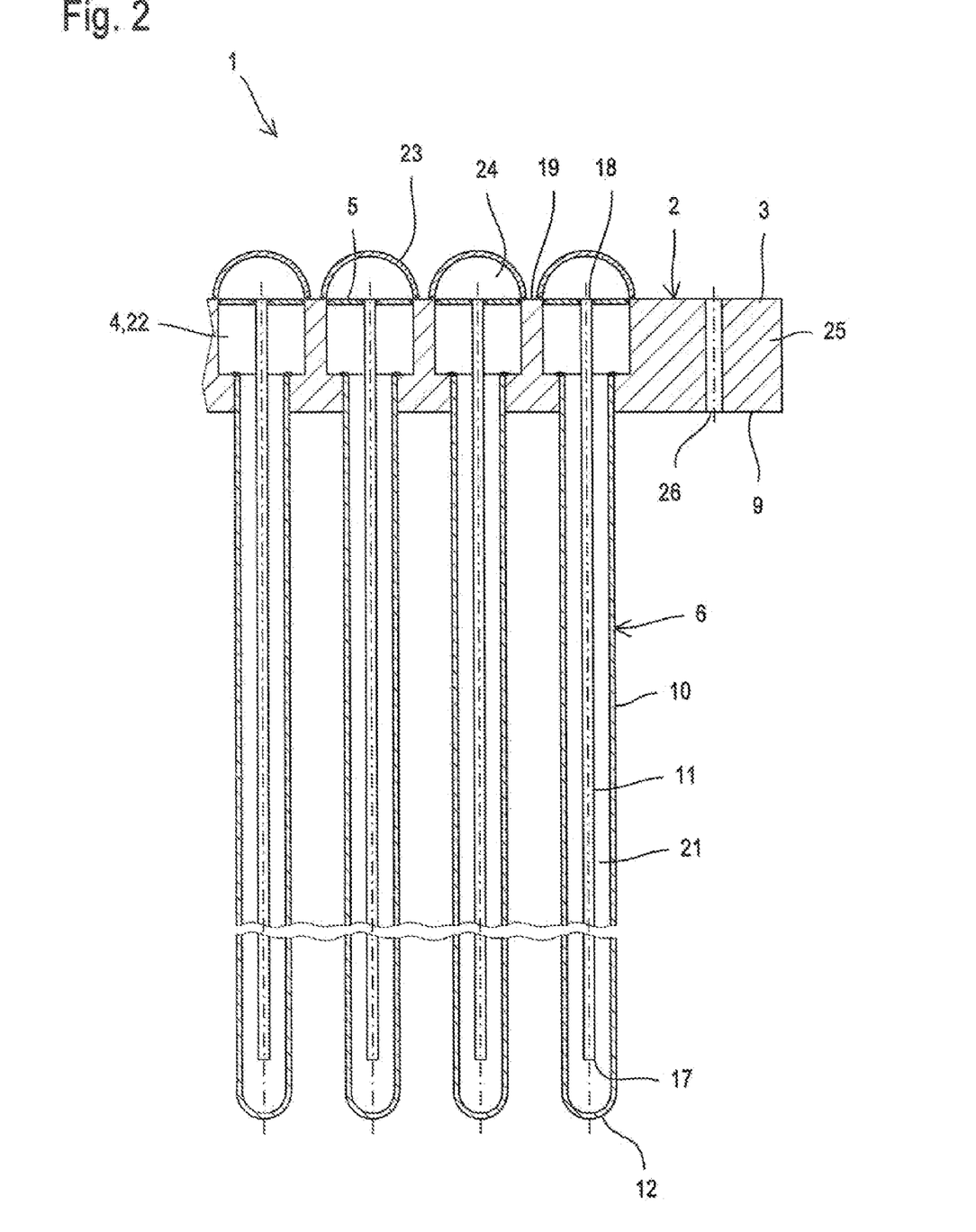
FIG. 2 shows a partial cross-section through a second embodiment of a cooling system in accordance with the invention.

In the embodiment shown in FIG. 2, a second arcuate lid 23 is arranged above each (first) flat lid 5 from the embodiment as shown in FIG. 1. The inner tubes 11 open into the respective space 24 between the first and the second lid 5, 23, so that these spaces 24 each form a distributor via which the cooling medium flows into the inner tubes 11. The second lids 23 each are tightly welded to the end faces 19 of the inner walls 7 between the grooves 4.

In the edge region 25, the plate 2 includes a bore 26 extending vertically through the same. When the cooling system 1 is incorporated in a shell-type reactor, the upper surface 3 and the lower surface 9 of the plate 2 are in flow connection with each other by means of this bore 26, whereby a pressure compensation is effected between the lower and the upper surface 9, 3.

In the embodiments of FIGS. 1 and 2, the grooves 4 are made by machining from a plate 2 of corresponding thickness.

Figure 3:
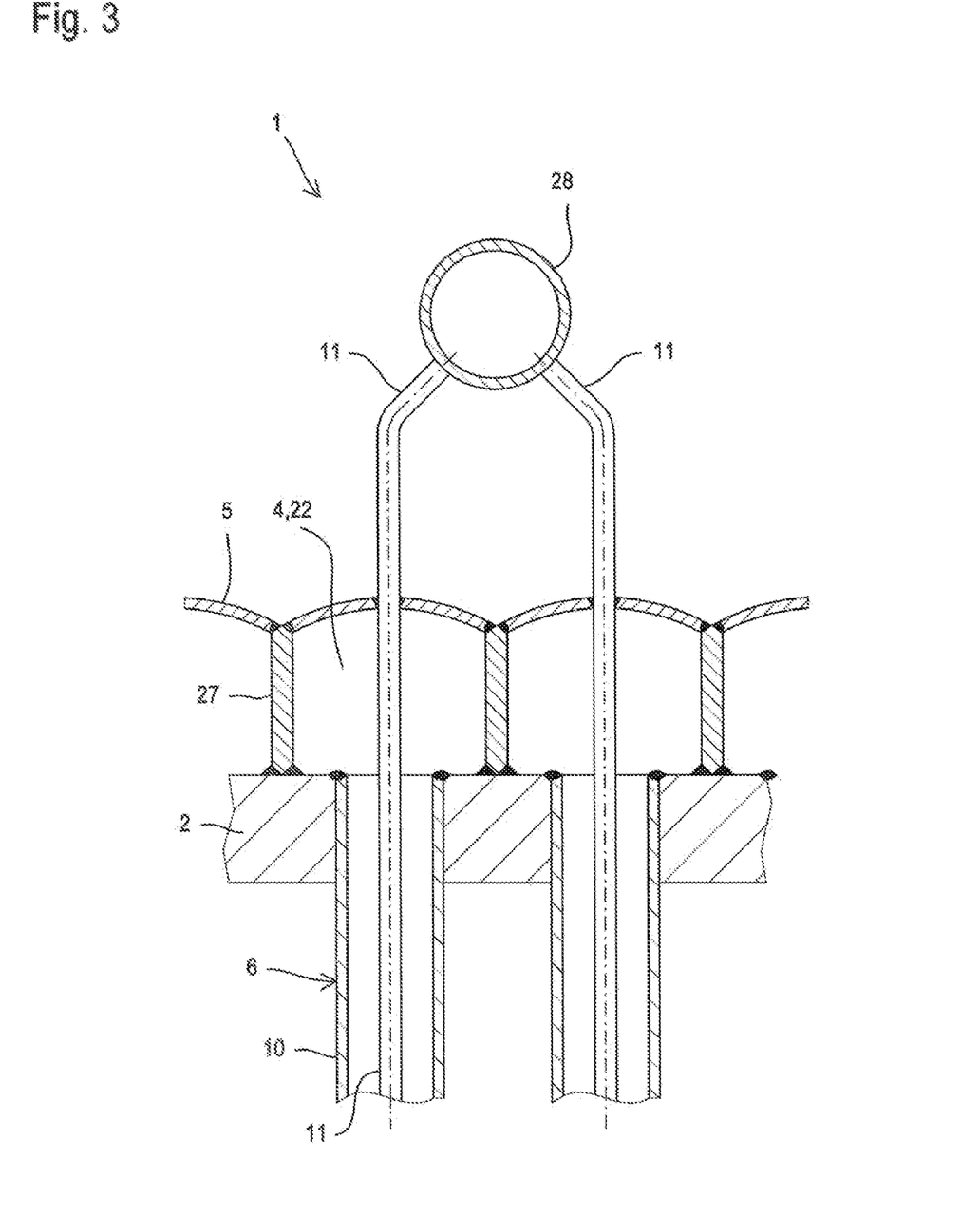
FIG. 3 shows a partial cross-section through a third embodiment of a cooling system in accordance with the invention.

In the embodiment shown in FIG. 3, the grooves 4 are made by welding webs 27 onto a thin plate 2. The first lids 5, which with the groove 4 each form the collectors 22, are of arcuate shape and on the upper end faces 19 of the webs 27 tightly welded to the same. The webs 27 form the common inner walls 7 of the grooves 4.

The inner tubes 11 extend through the lids 5 and open into a distributor 28 arranged above the plate 2, wherein in this embodiment the inner tubes 11 of two adjacent double tubes 6 open into a common distributor 28.

Figure 4:
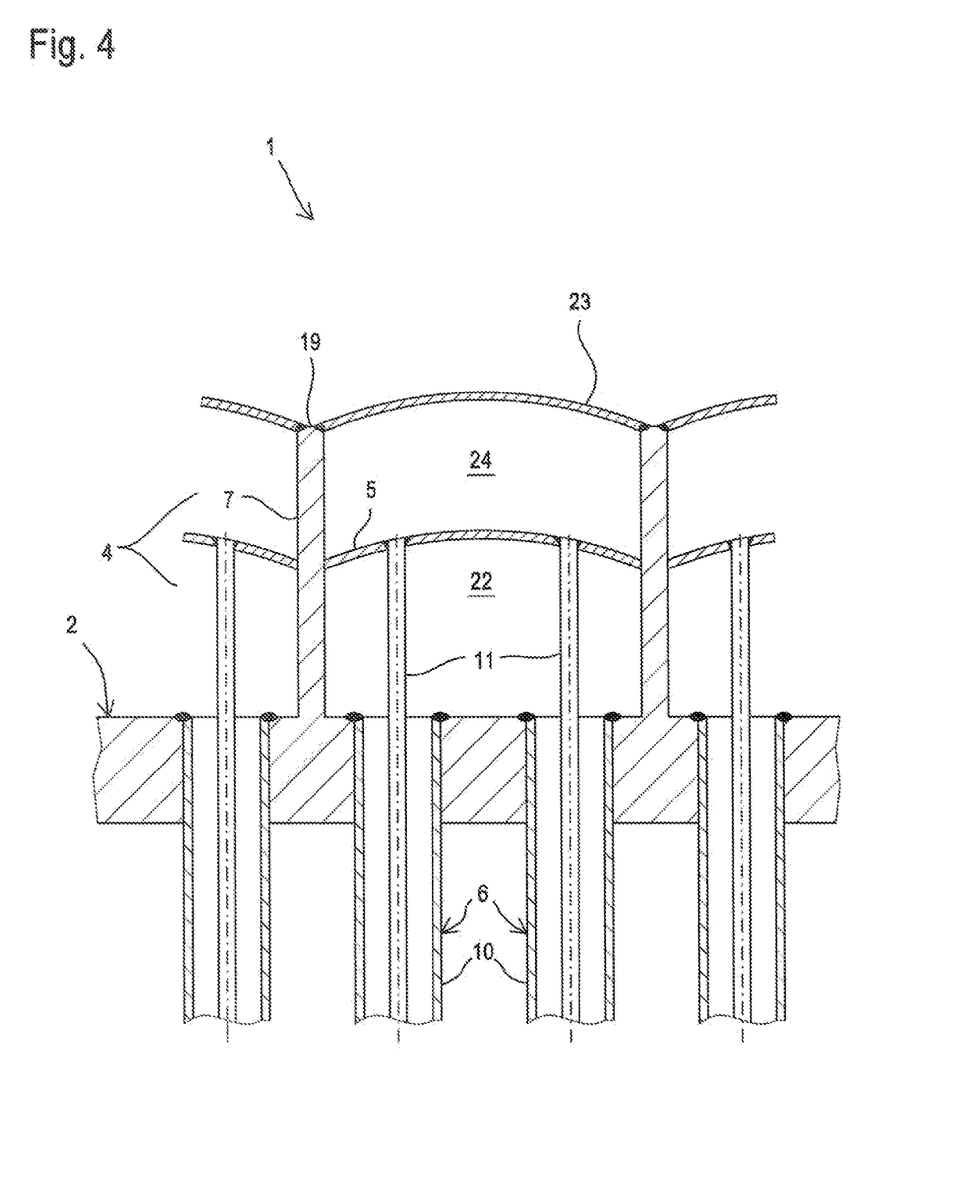
FIG. 4 shows a partial cross-section through a fourth embodiment of a cooling system in accordance with the invention.

In the embodiment shown in FIG. 4, the inner walls 7 between the grooves 4 extend beyond the first lids 5. The space 24 formed above the first lid 5 is closed by a second lid 23, which on the end faces 19 of the inner walls 7 is tightly welded to the same. The inner tubes 11 open into this space 24 between the first and the second lid 5, 23, which thus forms a distributor similar to the embodiment as shown in FIG. 2. Both the first and the second lid 5, 23 are of arcuate shape.

In FIG. 4 it is also shown that transverse to the longitudinal direction of the groove 4 two double tubes 6 open into the groove 4, i.e., the outer tubes 10 into the collector portion 22 of the groove 4 and the inner tubes 11 into the distributor portion 24 of the groove 4.

In FIGS. 5 to 8, shell-type reactors 50 or segments of shell-type reactors 50 with built-in cooling systems 1 in accordance with the invention are shown.

Figure 5:
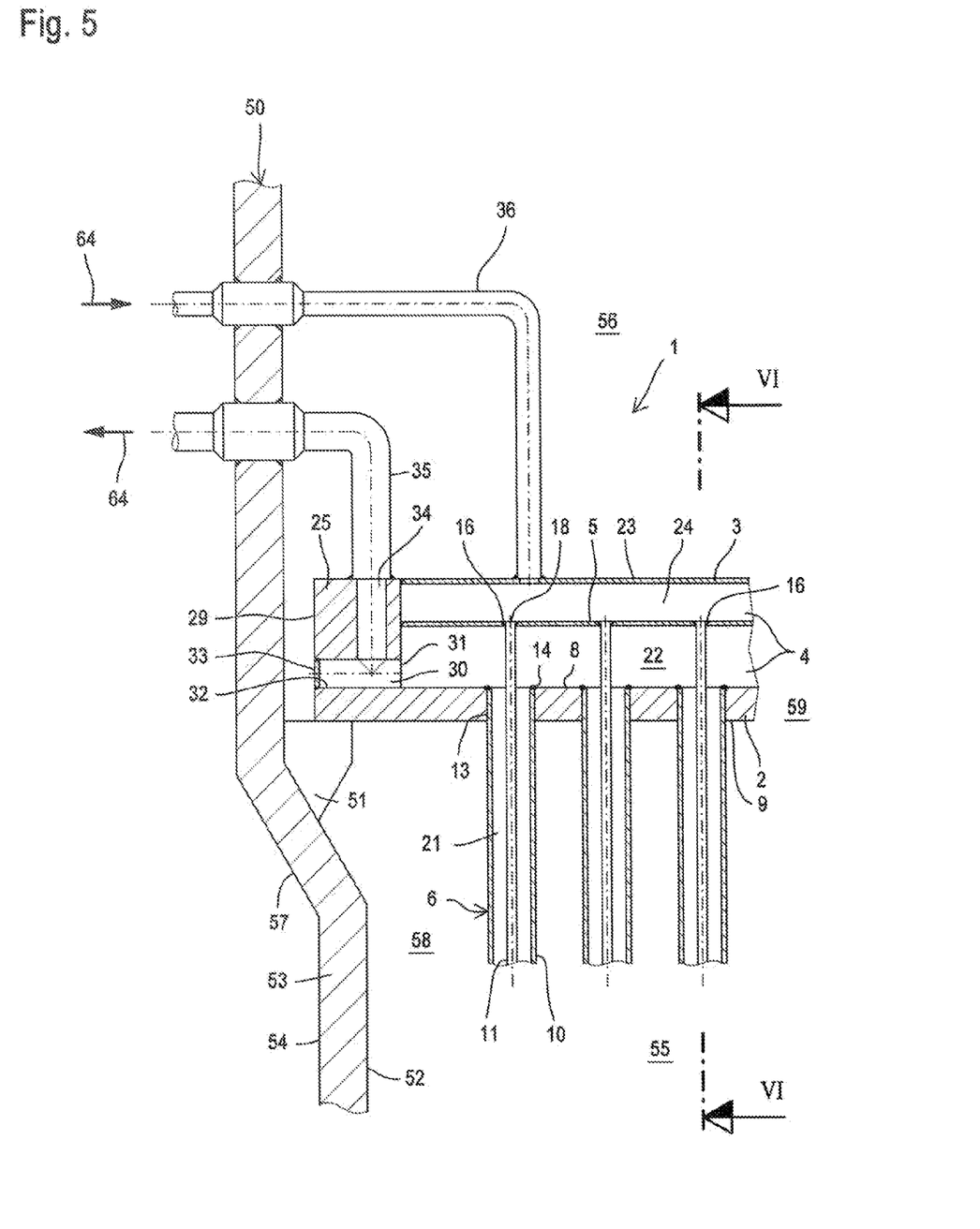
FIG. 5 shows a partial cross-section through a first embodiment of a shell-type reactor in accordance with the invention along line V-V in FIG. 6.
Figure 6:
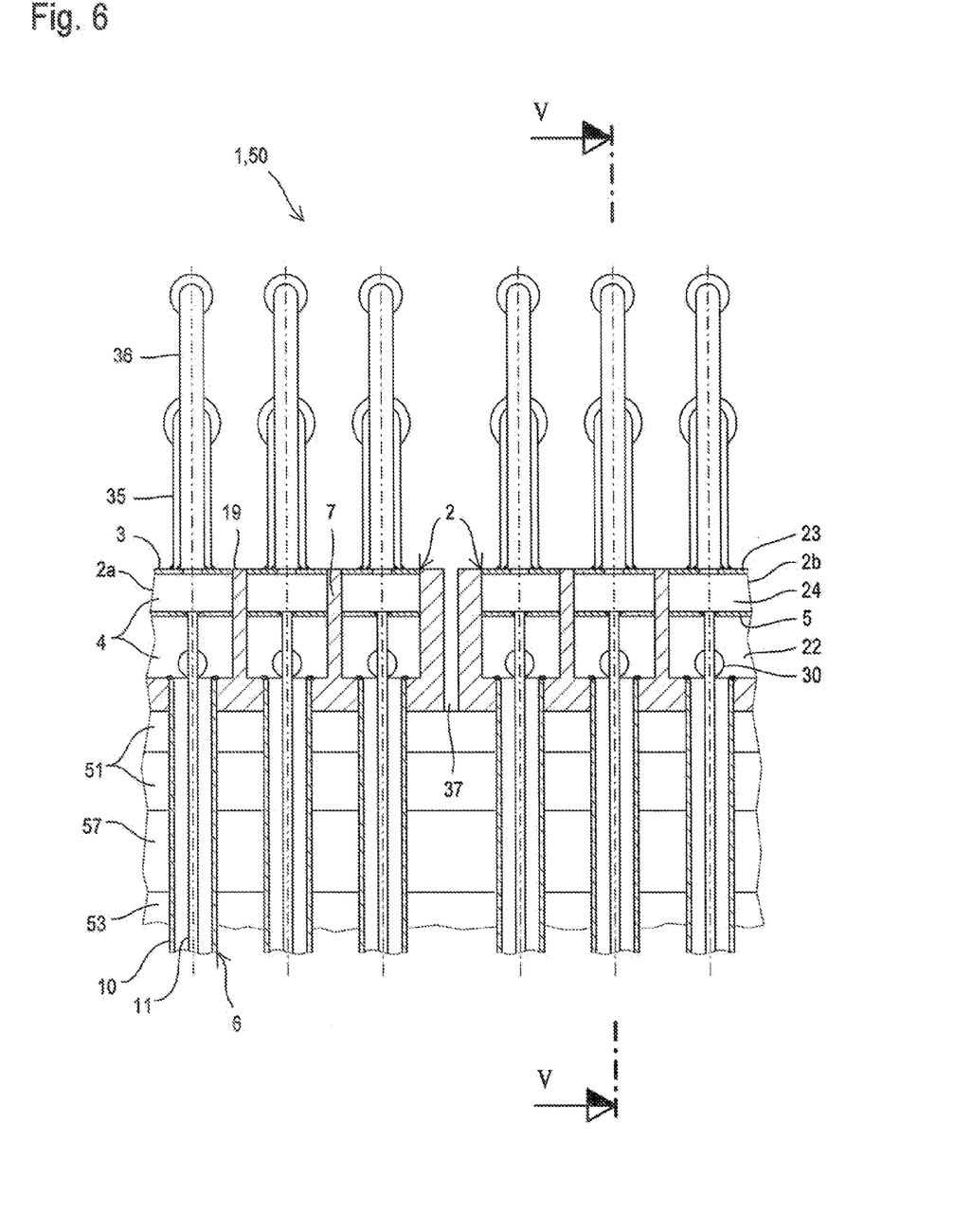
FIG. 6 shows a partial cross-section along line VI-VI in FIG. 5.

In the embodiment shown in FIGS. 5 and 6, the plate 2 rests on brackets 51, which are mounted on the inner surface 52 of the shell 53.

In the grooves 4, a collector 22 each is formed by a first lid 5 and a distributor 24 also is formed by a second lid 23, similar to the embodiment as shown in FIG. 4. In this example, the first and second lids 5, 23 are of flat shape, wherein the second lid 23 is aligned with the upper surface 19 of the inner walls 7.

Into each groove 4, only one double tube 6 opens transverse to its longitudinal direction. The outer tubes 10 each open into a collector 22 and are tightly welded to the plate 2 on the groove base 8 by means of a welding seam 14. The inner tubes 11 extend through the collectors 22 and the first lids 5 and open into the distributors 24, which each are formed between the first lid 5 and the second lid 23. The inner tubes 7 are each tightly welded to the first lids 5 by means of a welding seam 16.

The grooves 4, i.e., the collectors 22 and distributors 24 formed in the same, extend up into the edge region 25 of the plate 2 and end at a predetermined distance from the circumferential plate edge 29. In the edge region 25 of the plate 6, first horizontal bores 30 are formed, which with their one end 31 open into a collector 22 and with their other end 32 into the circumferential plate edge 29, wherein this second end 32 is, however, tightly closed with a plug 33.

Second bores 34 vertically extend from the upper surface 3 of the plate 2 into the first bores 30 and at the upper plate surface 3 are connected to a discharge tube 35, which extends through the shell 53 to its outer surface 54. The cooling medium 64 thus is passed from the collectors 22 through the first and second bores 30, 34 and the discharge tubes 35 out of the shell-type reactor 50.

Into the upper surface of each distributor 24. i.e., into each of the second lids 23, a supply tube 36 opens, which extends from the outer surface 54 of the shell 53 through the shell 53. The cooling medium 64 is supplied from outside of the shell-type reactor 50 through the supply tube 36 to the distributor 24, from which it flows into the inner tubes 11 of the double tubes 6.

In FIG. 6, it is shown that the plate 2 is divided in horizontal direction. The plate parts 2*a*, 2*b* lie one beside the other and between them form a gap 37 of predetermined size. This gap 37 connects the space 55 below the plate 2 with the space 56 above the plate 2 and thus provides for a pressure compensation between the upper surface 3 and the lower surface 9 of the plate 2.

In the vicinity of the bracket 51, the shell 53 is outwardly cranked. The distance of the radially outer double tubes 6 to the inner shell surface 52 below the crank 57 thereby is minimized, so that even in the edge region 58 of the shell space 59 sufficient cooling is effected and the horizontal temperature distribution up into the edge region 58 is very uniform.

Figure 7:
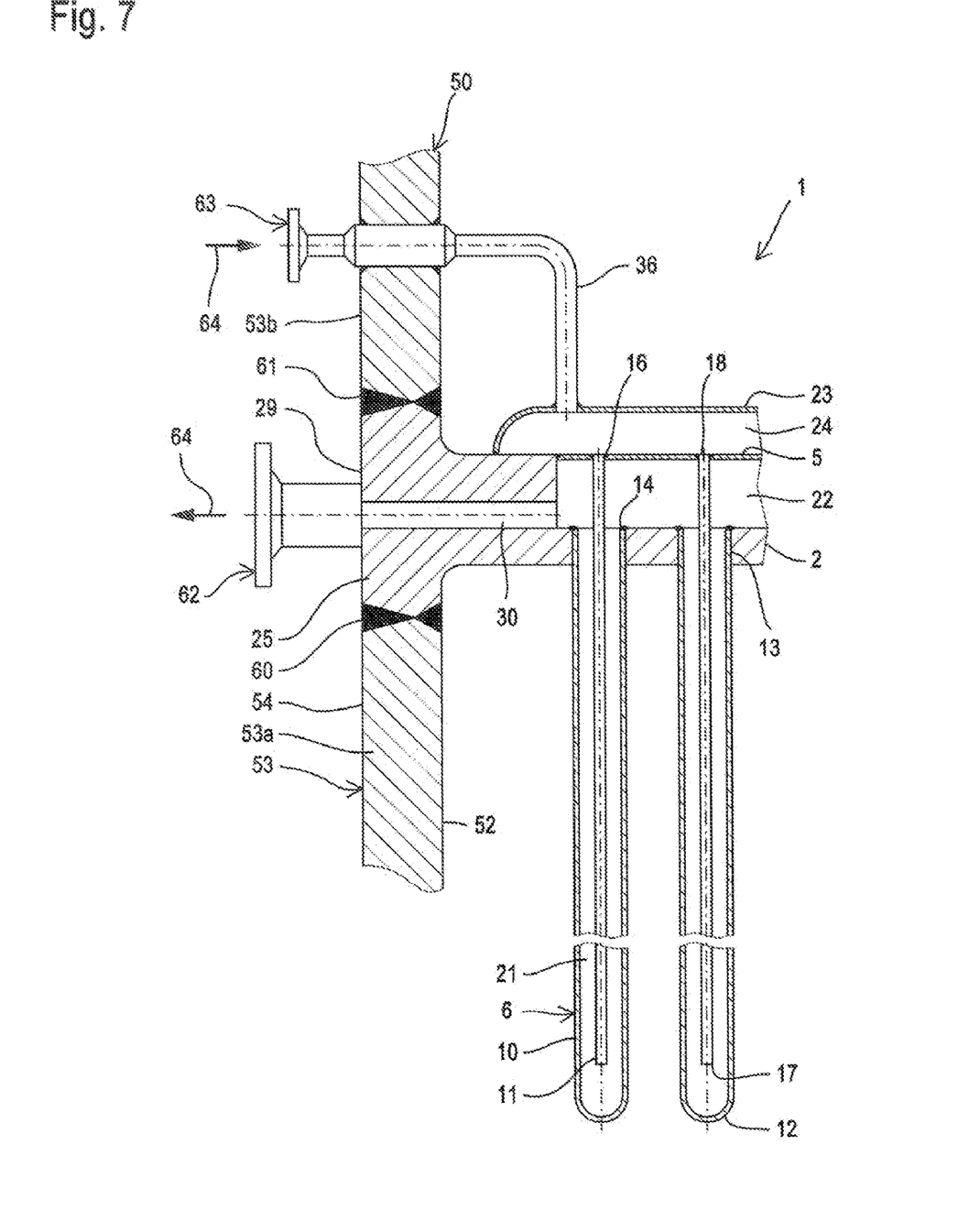
FIG. 7 shows a partial cross-section through a second embodiment of a shell-type reactor in accordance with the invention.

FIG. 7 shows an embodiment in which the plate 2 is tightly welded to the shell 53 along its entire circumference. The edge region 25 of the plate 2 here forms part of the shell 53, wherein the circumferential plate edge 29 is part of the outer surface 54 of the shell 53. For this purpose, the edge region 25 of the plate 2 is T-shaped and arranged between two shell sections 53a, 53b, to which it is tightly welded by means of two welding seams 60, 61.

The configuration of the collectors 22 and distributors 24 corresponds to the embodiment shown in FIG. 2.

From the circumferential plate edge 29 or from the outer surface 54 of the shell 53, a bore 30 each extends into a groove 4, i.e., into a collector 22. On the outer shell surface 54, the bore 30 is connected to a discharge means 62 for discharging the cooling medium from the collector 22.

Like in the embodiment shown in FIG. 5, the supply tube 36 extends from outside the shell-type reactor 50 through the shell 53 and opens into the upper surface 23 of the respective distributor 24, i.e., into the second lid 23. On the outer shell surface 54, the supply tube 36 is connected to a supply means 63 for the cooling medium 64.

Figure 8:
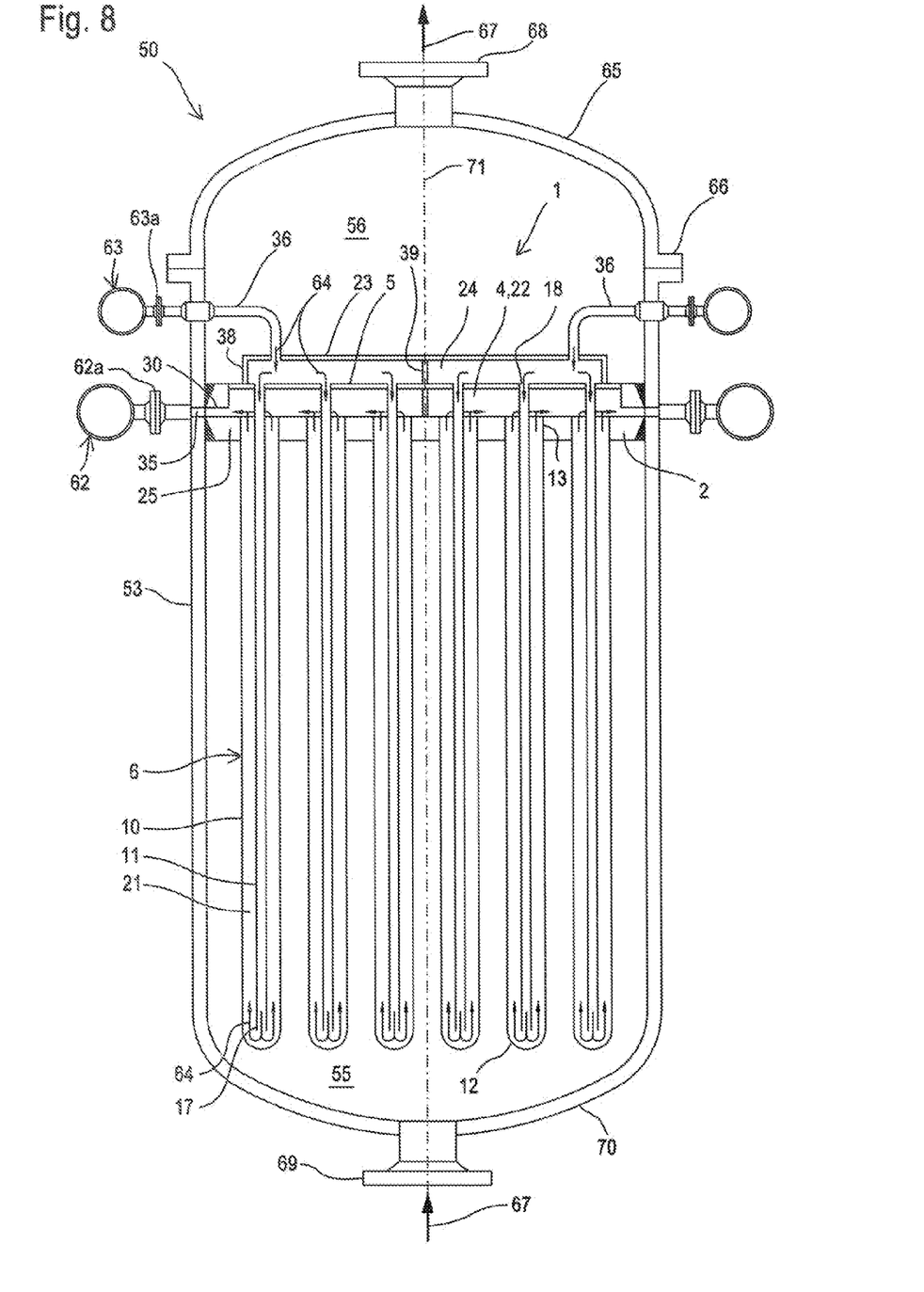
FIG. 8 shows a schematic representation of a longitudinal section through a third embodiment of a shell-type reactor in accordance with the invention.

In a schematic representation, FIG. 8 shows a complete longitudinal section through a shell-type reactor 50 of the invention. In this case, the circumferential plate edge 29 is tightly welded to the inner surface 52 of the shell 53. The plate 2 extends in one piece between the inner surfaces 52 of the shell 53.

The configuration of the collectors 22 and distributors 24 corresponds to the embodiment shown in FIGS. 2 and 7, wherein here the end faces 38 of the second lids 23, which form the distributors 24 above the first lids 5, are tightly welded onto the first lids 5 and do not extend in longitudinal direction of the groove 4 or collector 22 beyond the same and are not tightly welded to the edge region 25 of the plate 2, as is shown in FIG. 7.

In addition, the collectors 22 and distributors 24 each are divided in two in the middle of their longitudinal extension by a partition 39 extending transverse to their longitudinal direction, with each half being connected to discharge and supply means 62, 63 via its own discharge bores 30 and supply tubes 36, respectively.

With this configuration, localizing possible leakages in the cooling system 1 is facilitated further. The double tubes 6, which open into a common distributor 24 or collector 22, form a closed system and can be checked for tightness by applying a correspondingly high pressure. If the grooves 4 or collectors 22 and distributors 24 are divided in two by a partition 39, half the number of double tubes 6 connected to the groove 4 already form a closed system and as such can be checked for tightness. In the case of a leakage, the number of double tubes 6 concerned thus can be limited considerably.

The embodiment of a shell-type reactor 50 of the invention as shown in FIG. 8 includes an upper reactor head 65 which is flange-mounted to the cylindrical shell 53 by means of flanges 66, and a lower reactor head 70 which is welded to the shell 53. The reaction medium 67 is introduced into the shell-type reactor 50 via a supply nozzle 69 in the lower reactor head 70 and is discharged from the shell-type reactor via a discharge nozzle 68 in the upper reactor head 65. The shell 53 is erected vertically in the direction of its longitudinal axis 71, so that the plate 2 extends horizontally and the double tubes 6 extend vertically. Via vertical through bores (not shown) the space 55 below the plate 2 and the space 56 above the plate 2 are in flow connection with each other.

The cooling medium 64 flows through the supply tubes 36 into the distributors 24 and from the same into the inner tubes 11 of the double tubes 6. In the inner tubes 11 the cooling medium 64 flows downwards and at the lower end 17 of the inner tubes 11 exits into the outer tubes 10. In the space 21 between inner tube 11 and outer tube 10, the cooling medium 64 flows upwards again and from the upper ends 13 of the outer tubes 10 into the collectors 22. From there, it flows through the horizontal bores 30 and through respective, possibly present discharge tubes 35, through the shell 53 to the outside into the discharge means 62.

As shown in FIG. 8, the supply and discharge tubes 36, 35 for the cooling medium 64 each are flange-mounted to the supply and discharge means 63, 62. To find leaks or other damages, these flanges 63a, 62a can be released. On the outer surface 54 of the shell 53 each bore 30, i.e. each groove 4, then can be connected to a testing means, with which the connected groove 4 and the double tubes 6 connected thereto each can be tested for tightness.

In the cooling systems 1 of the invention only few and simple components are required: plate 2, grooves 4 with straight inner and/or outer walls, flat or uniformly curved lids 5, 23, double tubes 6.

Due to the formation of the collectors 22 and possibly distributors 24 as grooves 4 on a plate 2, the adaptation in shape to the inner shell surface 52 of a shell-type reactor 50 also is easier, since merely the course of the circumferential plate edge 29 must be cut to size correspondingly, for instance in the form of a circle with a circular cylindrical shell-type reactor 50.

While discussed in connection with specific embodiments, the present invention is not intended to be limited solely to the embodiments described. To the contrary, there are numerous variations and equivalents that should be apparent to those skilled in the art. Those variations and equivalents are intended to be encompassed by the present invention.

What is claimed is:

1. A cooling system for use in a shell-type reactor for catalytic exothermic reactions, comprising:
   at least two vertically extending double tubes which each include an outer tube and an inner tube, wherein the outer tube is closed at its lower end,
   at least one distributor for supplying a fluid cooling medium into the upper end of the inner tubes, and
   a horizontally extending plate, which on its upper surface includes at least two upwardly open grooves extending parallel to each other, wherein
   two adjacent grooves each are separated from each other by a common inner wall,
   at least one outer tube, having an upper end, is disposed in each groove, through the plate,
   each outer tube is tightly welded to the plate on the groove base,
   the upper, open side of each groove is closed with a lid, so that each groove forms a collector for discharging the cooling medium from the outer tubes, and
   each inner tube opens through the lid into a distributor and is tightly attached to the lid.

2. The cooling system according to claim 1, wherein the side walls of the grooves extend upwards beyond the respectively associated lid, the upper end of the grooves is closed with a second lid and the inner tubes open into the space between the first lid and the second lid, so that this space forms a distributor.

3. The cooling system according to claim 2, wherein the second lid is of arcuate shape.

4. The cooling system according to claim 1, wherein the plate is supported only in its edge region and the wall thickness of the plate below the groove bases permits the plate to be self-supporting.

5. The cooling system according to claim 4, wherein the grooves extend as longitudinal grooves between edge regions located opposite each other.

6. The cooling system according to claim 5, wherein the longitudinal grooves end before the circumferential plate edge.

7. The cooling system according to claim 1, wherein, in the edge region of the plate, bores are arranged, each of which, at one end, opens into the circumferential plate edge and at the other end, opens into a groove.

8. The cooling system according to claim 1, wherein the plate has at least one open cross-section extending through the entire plate thickness.

9. A shell-type reactor for catalytic exothermic reactions, comprising:
    an annular shell which is closed in circumferential direction and is arranged vertically in the direction of its longitudinal axis,
    an upper and a lower reactor head, which are tightly connected with the ends of the shell,
    a cooling system according to claim 1, wherein the plate is supported on the shell in its edge region.

10. The shell-type reactor according to claim 9, wherein the plate is tightly connected with the shell in its edge region.

11. The shell-type reactor according to claim 10, wherein the plate is arranged between two shell sections and the circumferential plate edge is part of the outer shell surface.

12. The shell-type reactor according to claim 10, wherein bores extend through the shell and the edge region of the plate, each of which, at one end opens into the outer shell surface and, at the other end, opens into a groove.

13. The shell-type reactor according to claim 10, wherein, on the outer shell surface, a bypass conduit is arranged, which connects the space below the plate with the space above the plate.

14. The shell-type reactor according to claim 9, wherein the circumferential plate edge is shaped such that, between the circumferential plate edge and the inner shell surface, at least one open cross-section is formed, which connects the space below the plate with the space above the plate.

15. The shell-type reactor according to claim 9, wherein a horizontal direction the plate is formed of at least two parts which lie one beside the other and between them form a gap of predetermined size, which connects the space below the plate with the space above the plate.

* * * * *